United States Patent [19]

Berman et al.

[11] Patent Number: 5,556,542

[45] Date of Patent: Sep. 17, 1996

[54] FLUID FILTER ASSEMBLY

[75] Inventors: Claude L. Berman; Donald W. Beach, both of Cookeville, Tenn.

[73] Assignee: Fleetguard, Inc., Nashville, Tenn.

[21] Appl. No.: 442,642

[22] Filed: May 17, 1995

Related U.S. Application Data

[63] Continuation of Ser. No. 128,991, Sep. 29, 1993, abandoned.

[51] Int. Cl.$^6$ .................................................. B01D 27/00
[52] U.S. Cl. ........................ 210/232; 210/440; 210/441; 210/450; 210/457; 210/493.2; 210/497.01
[58] Field of Search ........................... 210/232, 440–442, 210/450, 493.2, DIG. 17, 455, 457, 497.01

[56]          References Cited

U.S. PATENT DOCUMENTS

| | | | |
|---|---|---|---|
| 3,567,023 | 3/1971 | Buckman | 210/440 |
| 4,036,616 | 7/1977 | Byrns | 55/498 |
| 4,948,503 | 8/1990 | Baumann et al. | 210/232 |
| 4,992,166 | 2/1991 | Lowsky et al. | 210/440 |
| 5,024,761 | 6/1991 | Deibel | 210/232 |
| 5,118,417 | 6/1992 | Deibel | 210/232 |
| 5,171,430 | 12/1992 | Beach et al. | 210/94 |
| 5,211,846 | 5/1993 | Kott et al. | 210/450 |
| 5,374,355 | 12/1994 | Habiger et al. | 210/440 |
| 5,413,712 | 5/1995 | Gewiss et al. | 210/497.01 |

FOREIGN PATENT DOCUMENTS

| | | | |
|---|---|---|---|
| 1150442 | 4/1969 | United Kingdom | 210/493.2 |
| WO8901815 | 3/1989 | WIPO . | |
| WO92/17262 | 10/1992 | WIPO | 210/440 |

*Primary Examiner*—Matthew O. Savage
*Attorney, Agent, or Firm*—Woodard, Emhardt, Naughton, Moriarty & McNett

[57]          ABSTRACT

A snap-together, all-plastic filter assembly for filtering fluids includes a generally cylindrical injection molded plastic outer shell which has a closed base and an open opposite end and which defines a hollow interior which receives a filtering element and an integral injection molded plastic endplate/centertube member. The outer shell is injection molded with a pair of concentric, generally cylindrical, inner annular walls which are integral with the closed based and extend part way toward the open end of the outer shell. The filtering element which has a hollow interior fits down within the outermost of the two concentric annular walls and the centertube of the endplate/centertube member extends through the center of the filtering element and snaps in place by means of snap-fit projections which snap into snap-fit pockets disposed within the inner most of the two concentric annular walls. The filter assembly is designed as a spin-on filter and is threadedly engaged and positioned onto a mounting base thereby completing the fluid flow path. In related embodiments the filtering element is preassembled to the endplate/centertube member as a replaceable cartridge.

24 Claims, 13 Drawing Sheets

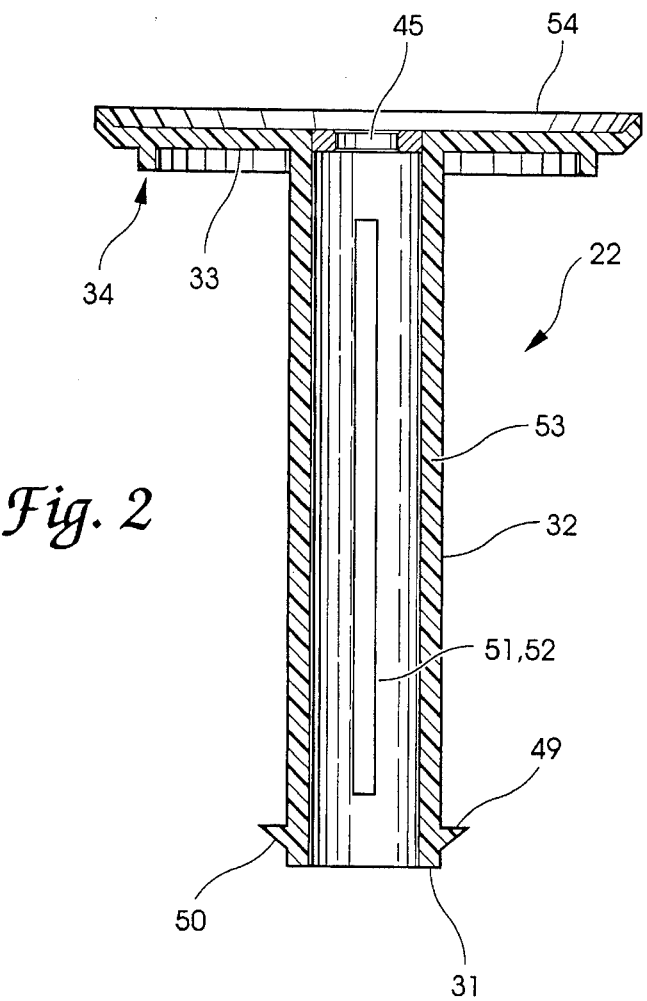
Fig. 2
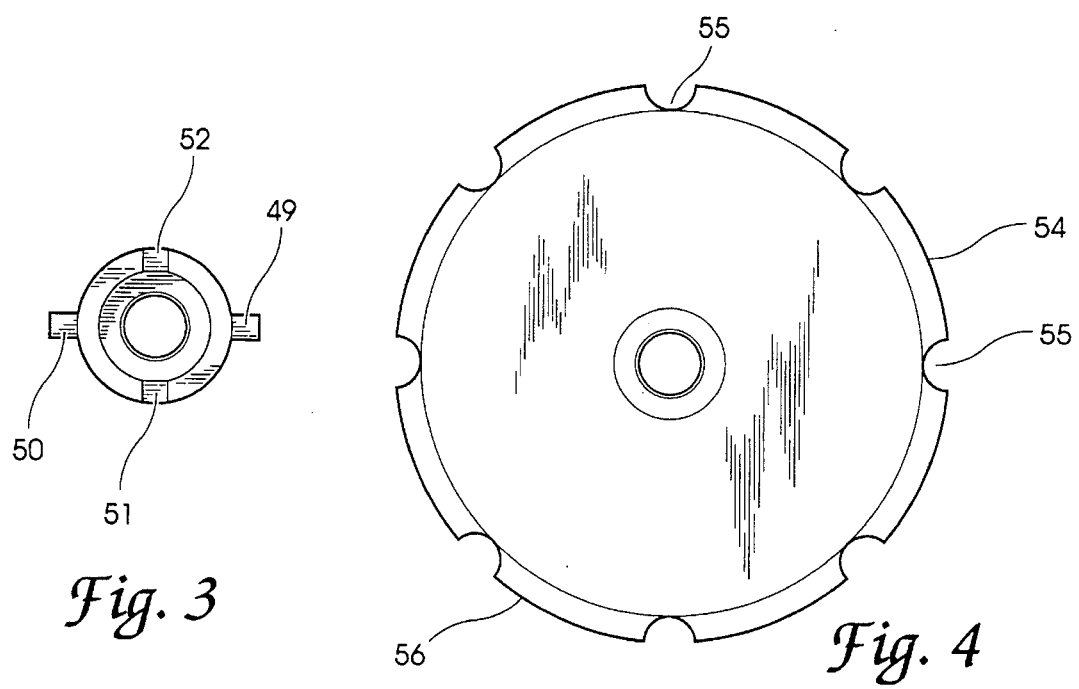
Fig. 3
Fig. 4

FLUID FILTER ASSEMBLY

This application is a continuation of application No. 08/128,991, filed Sep. 29, 1993, now abandoned.

BACKGROUND OF THE INVENTION

The present invention relates generally to fluid filtration and filter assembly design, including manufacturing methods for such filter assemblies. More specifically one embodiment of the present invention relates to the design of an all-plastic, injection molded filter assembly. A snap-together assembly technique is disclosed as one option and a replaceable filter cartridge is provided as another option. In a related embodiment the shell for the filter assembly is fabricated from die-cast aluminum or steel.

Conventional metal "spin-on" water filters which are manufactured for the heavy duty market typically require a substantial number of individually manufactured components. The process technology used to manufacture these filters is mature and offers little promise of significant cost reductions. In fact, as is common with mature technology, competition in the industry is fierce. This competition has resulted in pricing pressures and a trend threatening the profitability of manufacturers.

A typical metal filter requires the following components:

1. an outer shell
2. an open endplate
3. a closed endplate
4. a nutplate
5. a spring
6. an outer seal
7. an inner seal
8. a centertube
9. filtration media
10. potting compound Each of these components must be individually designed, manufactured, inventoried and handled in the assembly process which further drives up the overall cost. Additionally, the manufacturing processes required for some of these components include forming a rolled seam, forming threads in the nutplate and other specialized operations that add to the overall filter cost.

One recent effort to improve upon the design of the conventional metal "spin-on" filter is represented by U.S. Pat. No. 5,171,430 which issued Dec. 15, 1992 to Beach, et al. The Beach, et al. patent discloses a device which resulted from an attempt to produce a corrosion resistant (nearly all plastic), leak resistant (one piece shell with no seam), transparent filter. The Beach, et al. filter was designed to simplify the manufacturing process by reducing the number of components and the number of manufacturing steps. The Beach, et al. filter uses the following components:

1. an shell
2. an open endplate
3. a closed endplate
4. a centertube
5. filtration media
6. an outer seal
7. an retaining ring
8. a inner grommet
9. potting compound The Beach et al. filter reduces the number of components by one compared to existing metal designs, as previously mentioned. The Beach, et al. filter eliminates the seam formation step from the manufacturing processes, a step which was also required with existing metal filter designs.

The injection blow molding process used to make the shell of the Beach, et al. filter assembly presents three concerns. One concern is the availability of several vendors to perform the somewhat specialized injection blow molding process, a process which is made even more specialized by the use of an engineering resin. The suggested plastic materials in the Beach, et al. patent are selected in part for their high resistance to the temperatures and pressures to be experienced in a diesel engine and for their resistance to the solvent action of the fluids. A further factor in the selection of the Beach, et al. materials is that they provide transparency which is ideal to enable visual inspection of the fluid condition passing through the filter.

A second concern with the Beach, et al. shell manufacturing process (injection blow molding) is that the process does not allow any inside structural contouring or shaping of the shell below the threaded region. It is well documented in plastic engineering literature that the cost advantages possible in substituting plastic for other materials are usually only realized if the design takes advantage of the multi-functionality possible with a good plastic design. Unfortunately, with no inside surface contouring available with injection blow molding, it is not possible to build in the desired multi-functionality as is enabled and disclosed by the present invention.

A third concern with the Beach, et al. injection blow molding process is that material choices are limited. The injection blow molding process is limited to amorphous materials and this limits the choices of transparent materials. This process is also limited to unfilled materials and thus excludes the use of any filled (i.e., typically 10%–30% range of filling) material. This precludes the use of lower cost opaque materials leaving the manufacturer with only relatively high priced materials as his choices, such as transparent, amorphous engineering resins.

While the Beach, et al. filter design as described in U.S. Pat. No. 5,171,430 presents certain concerns, it also has certain beneficial aspects. Since the Beach, et al. filter assembly includes a plastic shell, products marketed according to this design will soften the market to the acceptance of plastic filter assemblies. Once customers accept plastic heavy duty filters, future designs, for example those which improve upon the Beach, et al. design, will be more readily accepted. In particular, as users realize the strength and basic performance characteristics of a plastic shell design, future plastic shell designs will be easier to market.

There are other filter designs which are known to the present inventors which disclose various features and fabrication techniques which might be of interest relative to the novelty of the present invention. A representative sampling of these earlier filter designs include the following listed patents and PCT application:

| Patent | Patentee | Issue Date |
| --- | --- | --- |
| 4,036,616 | Byrns | July 19, 1977 |
| 5,024,761 | Deibel | June 18, 1991 |
| 5,118,417 | Deibel | June 2, 1992 |
| Application No. | Applicant | Publication Date |
| WO 89/01815 | Thornton, et al. | March 9, 1989 |

The present invention builds upon the beneficial aspects of the Beach, et al. filter assembly and adds some redesign and various unique features to it, including a reduced number of component parts and an injection molded outer shell. The present invention also includes an injection molded, one-piece upper endplate and centertube with a snap-together assembly to the outer shell. This snap-together assembly concept involving the one-piece upper endplate and centertube may still be used when the shell is fabricated from die-cast aluminum or steel. In various embodiments of the present invention attention is given to the concept of and required structure for a replaceable filter cartridge. While the filtering element (media) of this cartridge may be securely assembled to the endplate/centertube unit, it is manually separable from that unit for disposal (incinerated) and then recycling of the plastic endplate/centertube unit.

The unique and novel features of the present invention are not found in Beach, et al. nor in any of the other listed references.

SUMMARY OF THE INVENTION

A snap-together filter assembly for filtering vehicle fluids according to one embodiment of the present invention comprises an injection molded plastic outer shell having an open end and means defining a hollow interior and including a closed base opposite to the open end. The shell further includes a first inner annular wall integral with the base and a second inner annular wall integral with the base, the first and second inner annular walls being generally concentric with each other and each extending part way towards the open end. The filter assembly includes a filtering element having means defining a hollow center portion and being disposed within the hollow interior of the outer shell and fitting within the first inner annular wall, and an integral endplate and centertube member having an endplate portion and a centertube and being assembled to the outer shell with a snap-together interface between the centertube and the second inner annular wall, the centertube extending through the hollow center portion of the filtering element.

In another related embodiment of the present invention the filtering element is preassembled to the endplate/centertube member and this assembly is designed as a replaceable filter cartridge. At the time of disposal the filtering element is separated from the endplate/centertube member and discarded. The endplate/centertube member is then reused with a new filtering element.

One object of the present invention is to provide an improved fluid filter assembly for vehicles.

Related objects and advantages of the present invention will be apparent from the following description.

BRIEF DESCRIPTION OF THE DRAWINGS

FIG. 2 is a side elevational view in full section of an endplate/centertube member comprising a portion of the FIG. 1 filter assembly.

FIG. 3 is an end view of the FIG. 2 endplate/centertube member.

FIG. 4 is an end view of the FIG. 2 endplate/centertube member.

DESCRIPTION OF THE PREFERRED EMBODIMENT

Figure 1:
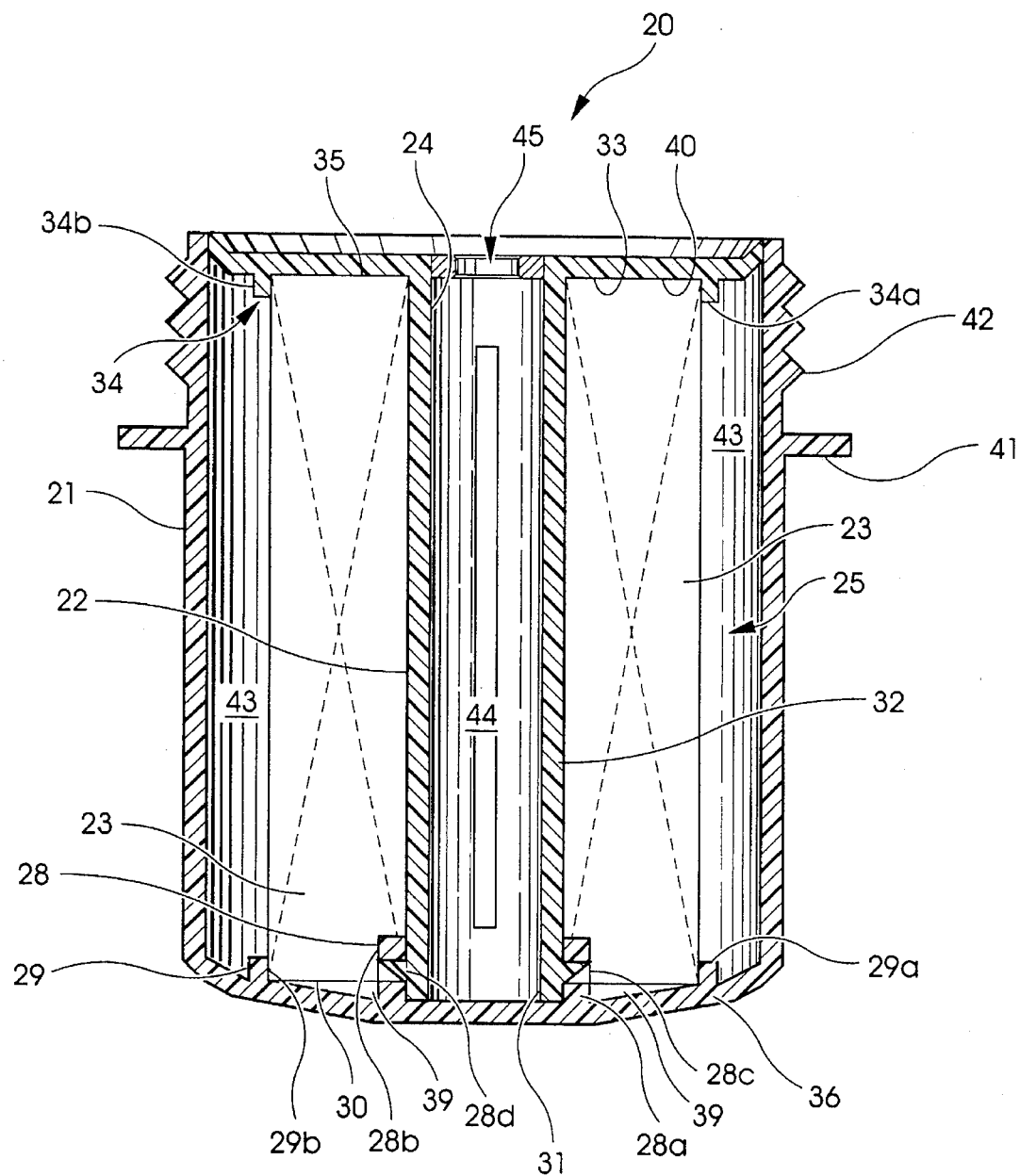
FIG. 1 is a side elevational view in full section of a filter assembly according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a fluid filter assembly 20 which includes an outer shell 21, endplate/centertube member 22 and filtering element 23. Outer shell 21 is fabricated as a single-piece, integral plastic component by an injection molding process, not to be confused with injection blow molding. By the selection of an injection molding process, as contrasted to an injection blow molding process, this manufacturing technique allows internal structural surfaces (walls) and features (tabs, recesses, ribs, etc.) to be created which are used as described hereinafter to position and attach internal filter assembly components. Further, by this injection molding process either lower cost opaque resins or higher cost transparent resins may be used as each are suitable plastics to be used in an injection molding process.

Endplate/centertube member 22 is fabricated as a single-piece, integral, plastic component by means of an injection molding process. In view of the fabrication of the outer shell 21 and the endplate/centertube member 22 entirely out of plastic, filter assembly 20 can be regarded as an all-plastic filter assembly and this type of design reduces weight and provides a filter assembly which is corrosion free.

While the full range of plastic molding resins are also suitable for endplate/centertube member 22, there is no need for member 22 to be transparent since it will be mounted onto and against a base. Any desire to inspect the fluid condition passing through the filter can be achieved by making outer shell 21 transparent. A related aspect to the injection molding of outer shell 21 and of endplate/centertube member 22 is the ability to change the resin color. This enables a wide variety of unique visual combinations which permit specific manufacturers to custom color code and design their filter assemblies.

Filtering element 23 is illustrated as a conventional, generally cylindrical element with a hollow center portion 24 for the exiting flow of fluid. The typical filtering media for filtering element 23 is pleated paper as is well known in the industry. While a variety of filtering elements can be used with the present invention, including those with different filtering media or chemical surface treatment, the general size and shape must be preserved so as to be compatible with the general size and shape of outer shell 21 as well as endplate/centertube member 22.

As illustrated in FIG. 1, outer shell 21 is injection molded with a hollow interior 25 and two interior, generally cylindrical, annular walls 28 and 29. Annular walls 28 and 29 are generally concentric with each other and integral with the closed base of the outer shell 21. Due to the full section view of FIG. 1 each of these annular walls appear as two generally rectangular portions 28a, 28b and 29a, 29b, respectively.

The inside diameter of annular wall 29 is sized and shaped so as to receive therein one end 30 of filtering element 23. The inside diameter of annular wall 28 is sized and shaped to receive therein the free end 31 of centertube 32. Annular wall 28 includes (i.e., defines) two oppositely-disposed snap-fit pockets 28c and 28d which cooperate with projections on centertube 32 so as to create a snap-fit or snap-together assembly of the endplate/centertube member 22 into the outer shell 21. The endplate portion 33 of member 22 is integral with centertube 32 and includes annular wall 34, illustrated in FIG. 1 as two generally rectangular portions 34a and 34b. The inside diameter of annular wall 34 is sized and shaped to receive therein the opposite end 35 of filtering element 23. Annular wall 34 is generally concentric with the endplate portion 33 and with the centertube 32 and the endplate portion 33 is generally concentric with the centertube 32. A shallow trough is defined by these concentric members and it is this shallow annular-ring trough which receives end 35 of filtering element 23.

In order to control the flow of fluid radially through the filtering media into the hollow center portion rather than axially out the ends, the ends 30 and 35 of filtering element 23 need to be sealed closed. To this end a potting compound is applied completely across the surfaces of ends 30 and 35. Additionally, potting compound is applied in regions 39 and 40 such that end 30 is bonded to the inside surface of the base 36 of outer shell 21 between walls 28 and 29. In region 40, end 35 of filtering element 23 is bonded to the inside surface of endplate portion 33 within the confines of annular wall 34. In a by-pass system it is not necessary to have the potting compound adhere to the base of the outer shell nor to the endplate portion as some fluid by-pass is acceptable. When the filter assembly is used for coolant some by-pass flow is acceptable. However, when the filter assembly is used for fuel, lubrication or oil fluids by-pass flow is not acceptable.

Outer shell 21 includes an exterior annular flange 41 and external threads 42. Designed as a spin-on filter assembly, filter assembly 20 threadedly engages into a corresponding mounting base which provides a sealed flow inlet and an exiting flow outlet. The fluid flow entering the mounting base flows through apertures in the endplate portion 33 which are radially outwardly of annular wall 34. From there the fluid flows into annular clearance region 43 so as to pass down and around filtering element 23. The fluid flow through filtering element 23 passes into its hollow center portion 24 where centertube 32 is present. Centertube 32 has a hollow interior 44 and is axially slotted at two oppositely disposed locations so as to provide a fluid flow path from center portion 24 into hollow interior 44 and from there to outlet orifice 45. Orifice 45 is generally concentric with the endplate portion 33 and with the hollow interior 44.

Figure 1A:
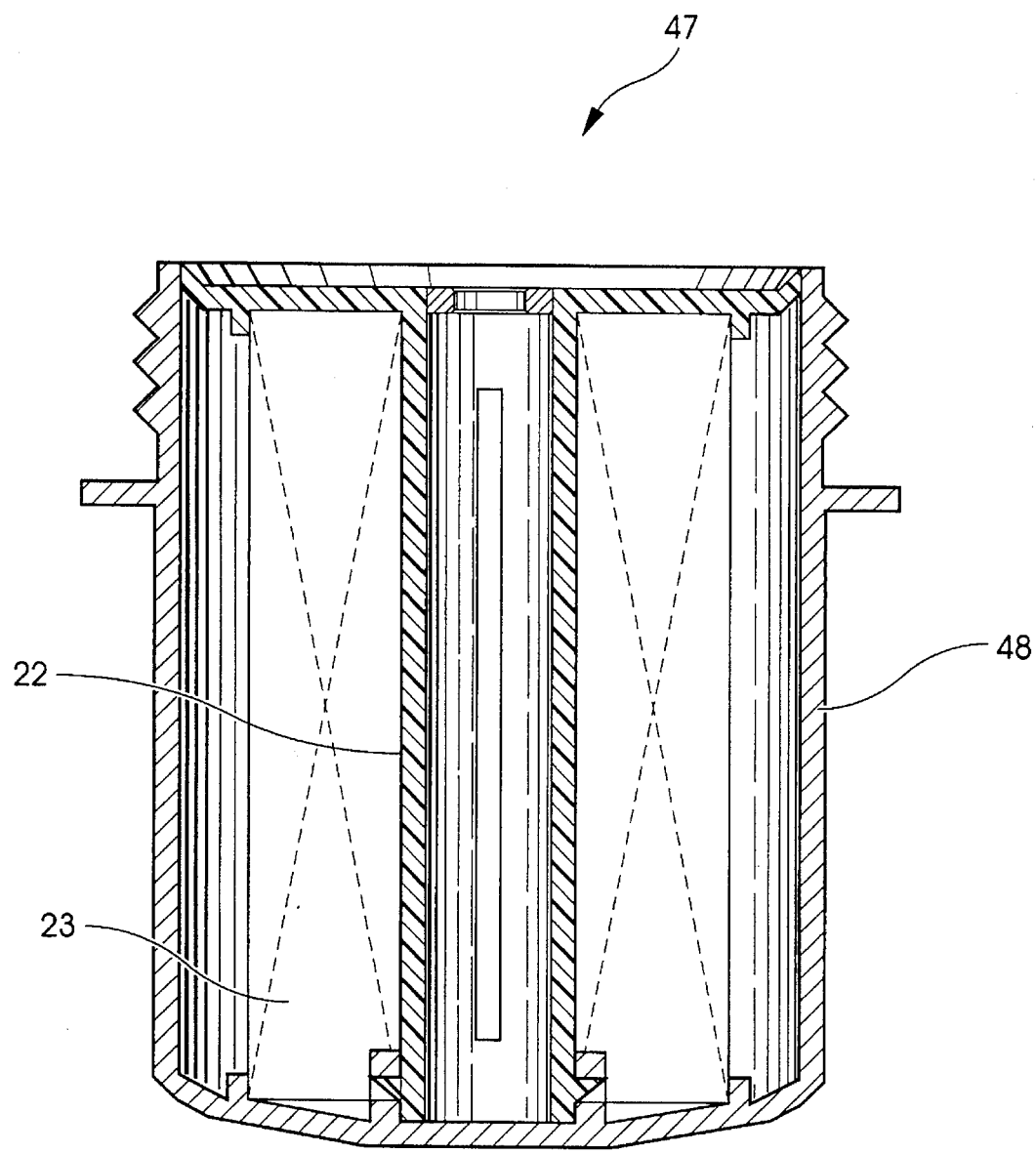
FIG. 1A is a side elevational view in full section of a filter assembly corresponding to the FIG. 1 assembly but having a different material for the outer shell.

Referring to FIG. 1A there is illustrated a fluid filter assembly 47 which includes an outer shell 48, endplate/centertube member 22 and filtering element 23. Virtually every feature and aspect of fluid filter assembly 47 is the same as fluid filter assembly 20 except for outer shell 48. Outer shell 48 is fabricated from die-cast aluminum rather than being injection molded out of plastic as is the case with outer shell 21. While outer shell 48 may also be fabricated from die-cast steel, the sole difference between assembly 20 and assembly 47 is the material used to fabricate the outer shells. Accordingly, the same reference numerals have been used in FIG. 1A as in FIG. 1 in order to denote the same or identical parts and features.

Referring to FIG. 2–4 the endplate/centertube member 22 is illustrated in greater detail. As disclosed in FIGS. 2 and 3, adjacent the free end 31 of centertube 32 are a pair of oppositely-disposed snap-fit projections 49 and 50. These two projections are designed to snap into snap-fit pockets 28c and 28d. The snap-fit of projections 49 and 50 into pockets 28c and 28d, respectively, provides the entirety of the snap-together assembly of the outer shell 21 and endplate/centertube member 22. Any load on the filter assembly 20 which might tend to weaken the snap-together interface is relieved once the filter assembly 20 is mounted (spun-on) to the base. The spinning on of the filter assembly to the mounting base anchors the outer shell to the base while pushing against the endplate portion 33 to ensure proper sealing around the endplate portion. U.S. Pat. No. 5,171,430 issued Dec. 15, 1992 to Beach et al. discloses a typical spin-on mounting for a filter assembly to a base. This patent reference is expressly incorporated by reference herein for its teaching of this spin-on mounting and for its teaching of the incoming and exiting fluid flow path through the base.

In FIG. 3 axial slots 51 and 52 are illustrated. In addition to providing the fluid flow path from the hollow center portion 24 of the filtering element 23 to the outlet orifice 45 via hollow interior 44 of centertube 32, these two slots allow flexture of the centertube wall 53 for release and ejection of the part from its mold and during snap-fit assembly of member 22 into outer shell 21. In FIG. 4 sealing plate 54 appears as a generally circular member having inlet orifices 55 and a center clearance aperture 56 which is concentric with outlet orifice 45.

Figure 5:
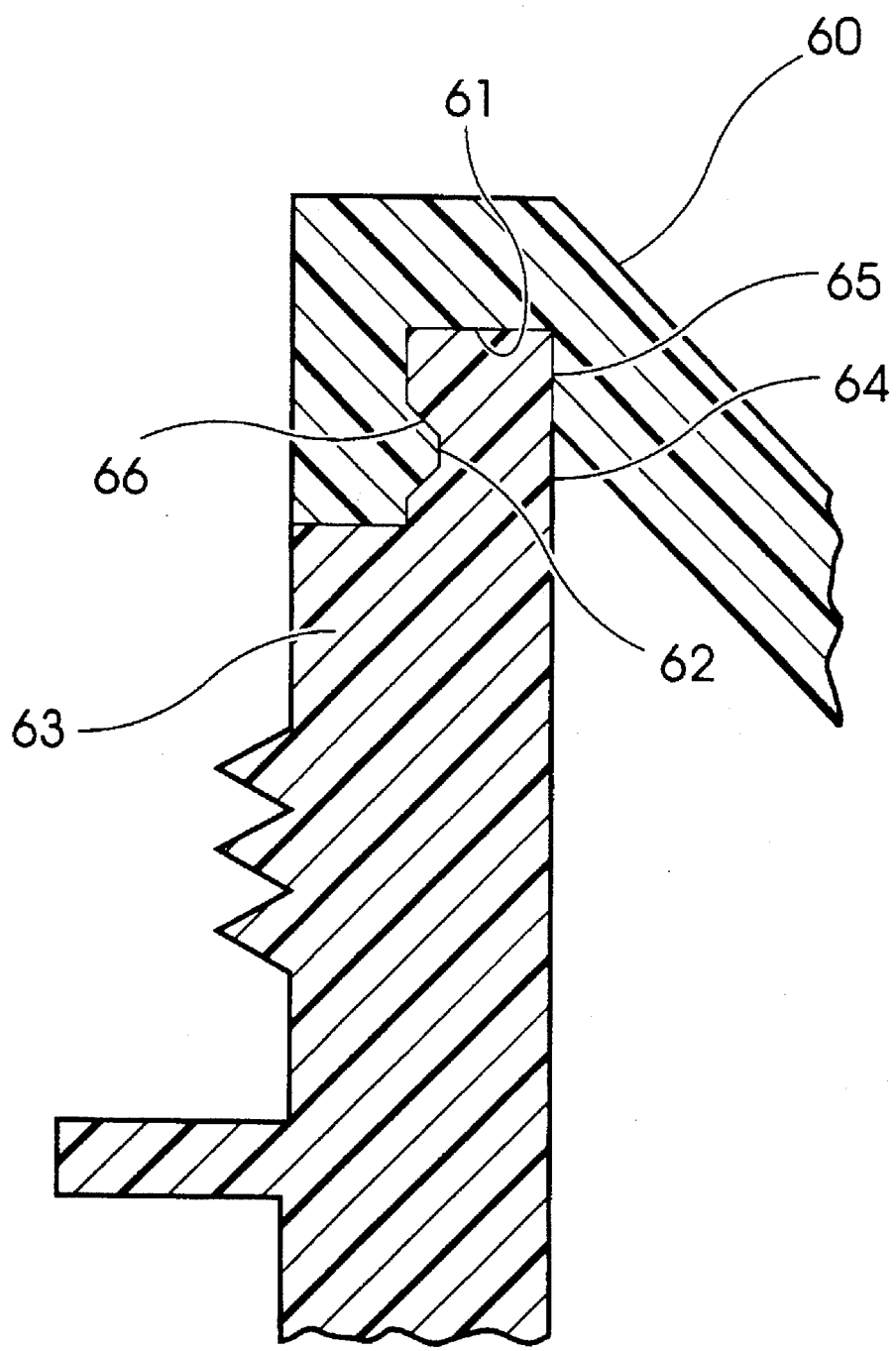
FIG. 5 is a partial, enlarged detail of an alternative snap-together technique joining the outer shell and the endplate/centertube member together, according to the present invention.

Referring to FIG. 5 there is illustrated an alternative design for the assembly of the endplate portion of the endplate/centertube member to the outer shell. In FIG. 5 endplate portion 60 is shaped with an annular receiving channel 61 and an inwardly extending annular rib 62. In a matching and mutually engaging fashion the outer shell 63 has a contoured upper wall 64 with a reduced diameter end 65 that fits within channel 61 and an annular channel 66 which receives rib 62. The seating of end 65 into channel 61 and rib 62 into channel 66 creates a secure snap-fit assembly of the outer shell 63 and the endplate/centertube member which provides portion 60.

Referring to FIGS. 6–9 there is illustrated another embodiment of the present invention. Filter assembly 80 includes an outer shell 81, endplate/centertube member 82 and filtering element 83. In this embodiment the endplate/centertube member 82 is preassembled with the filtering element 83 into a replaceable filter cartridge. While the assembly of the endplate/centertube member 82 into the outer shell 81 is illustrated as a snap-fit assembly, alternative assembly techniques are envisioned such as threaded engagement. Whether using a snap-fit assembly technique or threaded engagement, the replaceable filter cartridge concept of the present invention is maintained.

Outer shell 81 is fabricated out of plastic by injection molding and suitable materials include the more costly transparent engineering resins as well as the less costly opaque, filled engineering polymers. The use of injection molding, as contrasted to injection blow molding, enables the molding of interior shapes and forms. As illustrated, outer shell 81 includes an interior, generally cylindrical wall 86 which is integrally molded with and extends from the closed base portion 87 of the outer shell. The outer shell 81 also includes an outer radial flange 88 and an externally threaded portion 89 which is adjacent the open end 90 of outer shell 81.

The externally threaded portion 89 engages a corresponding and mating thread portion 91 as part of adapter base 92. Base 92 is provided so as to convert a conventional spin-on (filter) head so as to make it compatible to accept filter assembly 80. Adaptor base 92 could be provided as an integral mounting head on the engine. When adapter base 92 is used as an interface component to enable filter assembly 80 to spin onto the conventional head, the spin-on engagement is via threaded outlet 95. The fluid flow communication to threaded outlet 95 is via hollow stem 96 which extends up into the interior of the centertube portion and thus up into the interior of the filtering element. Apertures 97 and 98 provide two inlet passageways for the incoming fluid which is to be filtered.

Figure 6:
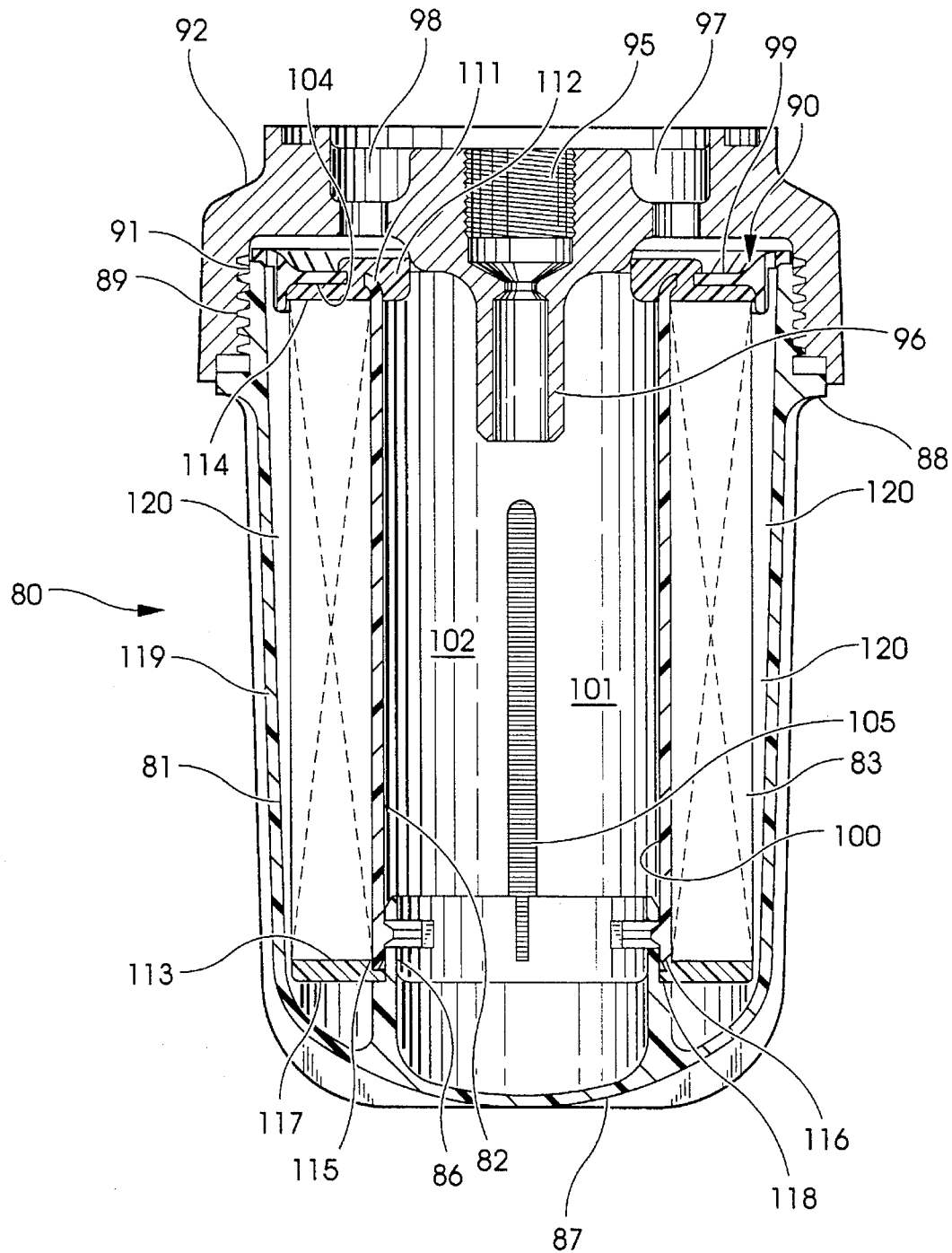
FIG. 6 is a side elevational view in full section of a filter assembly according to a typical embodiment of the present invention.

The endplate/centertube member 82 is an integral, injection molded component which includes an endplate portion 99 and a generally cylindrical centertube portion 100 which is generally concentric with the endplate portion 99. The centertube portion defines a hollow interior 101 which provides part of the exit flow path for the fluid to be filtered. The centertube portion 100 is sized so as to fit closely within the hollow center region 102 of the filtering element 83. As is illustrated, the hollow center region 102 of the filtering element 83 receives the centertube portion 100 and the upper end of the filtering element is adjacent the interior surface 104 of the endplate portion 99, separated by a thickness of urethane adhesive. Centertube portion 100 includes two oppositely-disposed axial slots 105 and 106, only one of which is illustrated in FIG. 6 due to the full section view (see FIG. 9). The fluid flowing down and around the exterior of the filtering element is pushed through the filtering media and flows to the hollow center region 102 of the filtering element. The fluid must then find the two axial slots 105 and 106 so as to enter the hollow interior of centertube portion 100. The flow then exits via stem 96 and outlet 95.

There are three important design considerations regarding the assembly of the replaceable filter cartridge (i.e. the filtering element preassembled to the endplate/centertube member) into the outer shell. First, a seal needs to be established between the inside diameter edge 111 of the endplate portion and the adapter base. In the illustrated embodiment this seal is created by an annular ring or annular exit flow seal 112 which is disposed around the centertube and fabricated out of urethane adhesive.

A second consideration is to seal both ends 113 and 114 of the filtering element. The third consideration is to seal the lower interior edge 115 of the filtering element to the free end 116 of the centertube portion. In the illustrated embodiment a thickness 117 of urethane is applied across the lower end 113 of the filtering element 83 and a lip 118 of urethane is left which extends radially inwardly across the the free end of the centertube portion. When the centertube portion snaps into the interior wall 86, this radial lip 118 of urethane forms an annular sealing gasket that is clamped between the two (abutting) surfaces thereby creating a sealed interface.

While the outer shell 81 has been described as having a generally cylindrical outer wall 119 and a closed base portion 87, there is in fact a slight draft angle on the interior surface of the outer wall. This draft angle tapers or converges toward the closed base portion. This is why the width of the clearance space 120 between the outer surface of the filtering element and the inside surface of the outer wall gets smaller when moving from the open end in the direction of the closed based portion.

Figure 7:
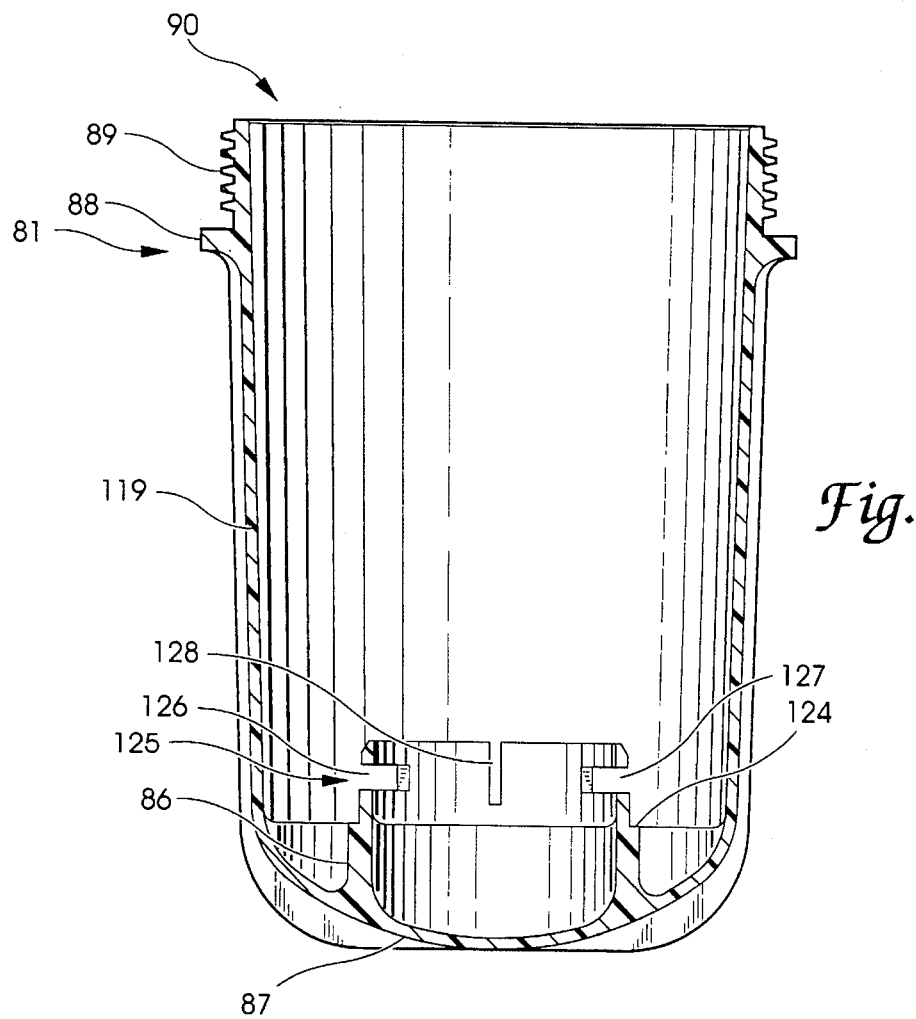
FIG. 7 is a side elevational view in full section of an outer shell comprising a portion of the FIG. 6 filter assembly.
Figure 7A:
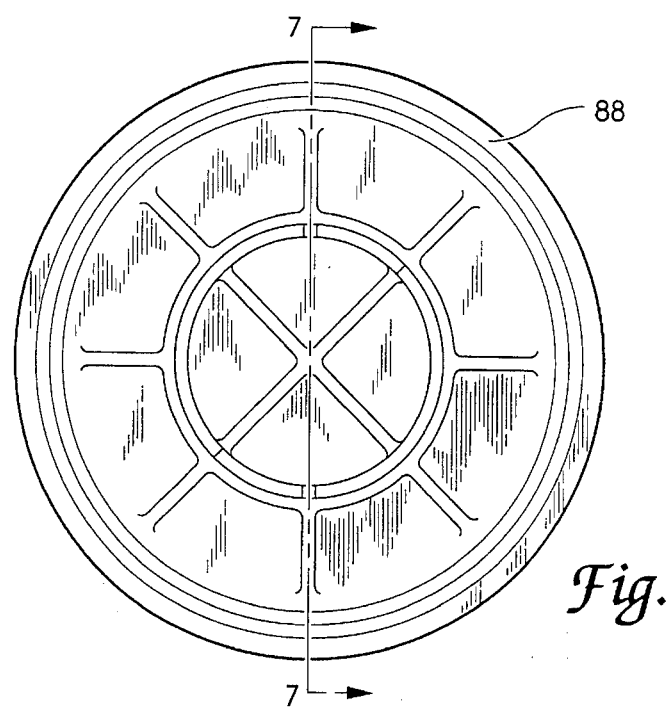
FIG. 7A is a top plan view of the open end of the FIG. 7 outer shell.

Referring to FIGS. 7 and 7A the outer shell 81 of the FIG. 6 assembly is illustrated in detail as a full section view (FIG. 7) and as a top plan end view (FIG. 7A). The cutting plane which provides FIG. 7 is illustrated in FIG. 7A. While most of the structural features have been described with the FIG. 6 description, there are a few aspects which are now described in greater detail with regard to FIGS. 7 and 7A, including the interior shaping of outer shell 81.

Interior wall 86 is generally cylindrical and integrally extends up from the closed base portion 87 part way toward open end 90. Interior wall 86 is positioned so as to be generally concentric with open end 90 and with outer wall 119. Interior wall 86 is described as "generally" cylindrical for the reason that there are various surface contours molded into this interior wall. Ledge 124 which is formed in wall 86 is a substantially flat surface which is transverse relative to the longitudinal axis of the outer shell. Ledge 124 provides the abutment surface for the free end 116 of the centertube portion to clamp against radial lip 118.

The reduced diameter portion 125 of wall 86 includes (defines) two oppositely-disposed, snap-fit pockets or apertures 126 and 127 and two oppositely-disposed slots, only one slot 128 being illustrated in FIG. 7 due to the full section view. As illustrated, the two pockets and two slots are arranged in an alternating pattern on 90 degree interval spacing. The two pockets are designed to receive two oppositely-disposed snaps or snap-fit projections 130 and 131 which are integrally molded and disposed on the interior wall surface of the centertube portion, see FIGS. 8 and 9. The circumferential extent of each snap is approximately 45 degrees and thus each pocket 126 and 127 must extend for at least 45 degrees to ensure that the two snaps will in fact snap-fit into their corresponding pockets thereby forming a connecting means for defining a snap-together interfit between the centertube and annular wall to secure the endplate and centertube member to the outer shell. Each snap 130 and 131 has a tapered lower (leading) surface so as to make the insertion and snap-fit assembly of the centertube portion easier to achieve.

The two slots 128 are each approximately 0.07 inches (1.78 mm) wide and 0.37 inches (9.40 mm) deep. These two slots are provided so as to give the interior wall 86 some flexibility and make it easier to remove the mold core end and to press the free end 116 of the centertube portion over the interior wall 86. Further, when the preassembly of the filtering element 83 to the endplate/centertube member 82 creates a replaceable cartridge, there will be a need to unsnap the centertube portion from the interior wall. While this removal step can be eased somewhat by tapering the opposite underside surface of each snap, a slight inward flex as enabled by the two slots 128, helps in the removal process.

The exterior surface of the outer shell 81 is formed with two equally spaced series of four ribs each. In the main body portion of the outer shell, such as just below radial flange 88, there are eight ribs on equal 45 degree spacing. Then as these ribs extend axially toward the closed base portion, one series of four ribs on 90 degree spacing ends and the remaining series of four ribs extend into a common point at the geometric center of the closed base portion 87 of the outer shell.

Figure 8:
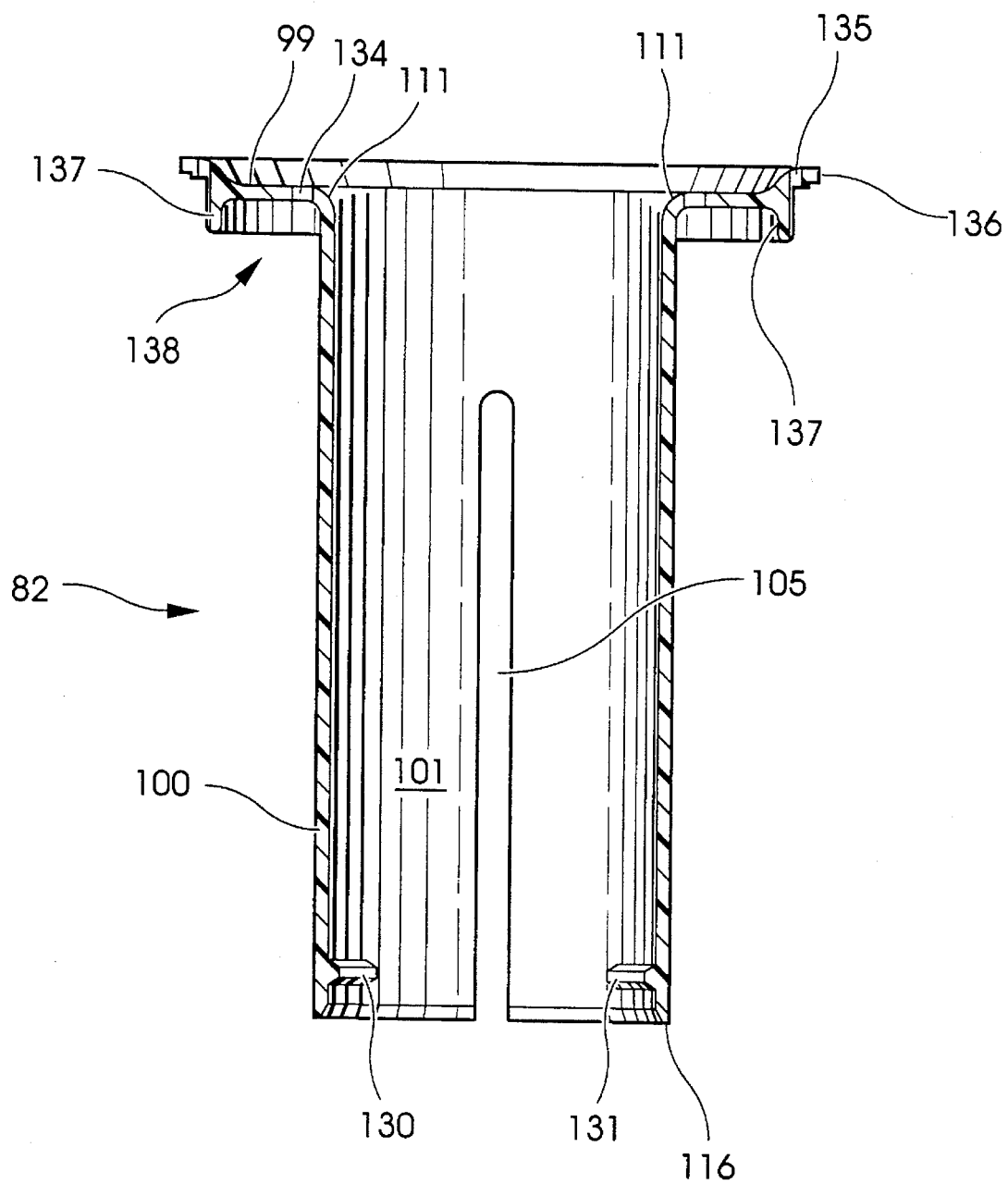
FIG. 8 is a side elevational view in full section of an endplate/centertube member comprising a portion of the FIG. 6 filter assembly.
Figure 9:
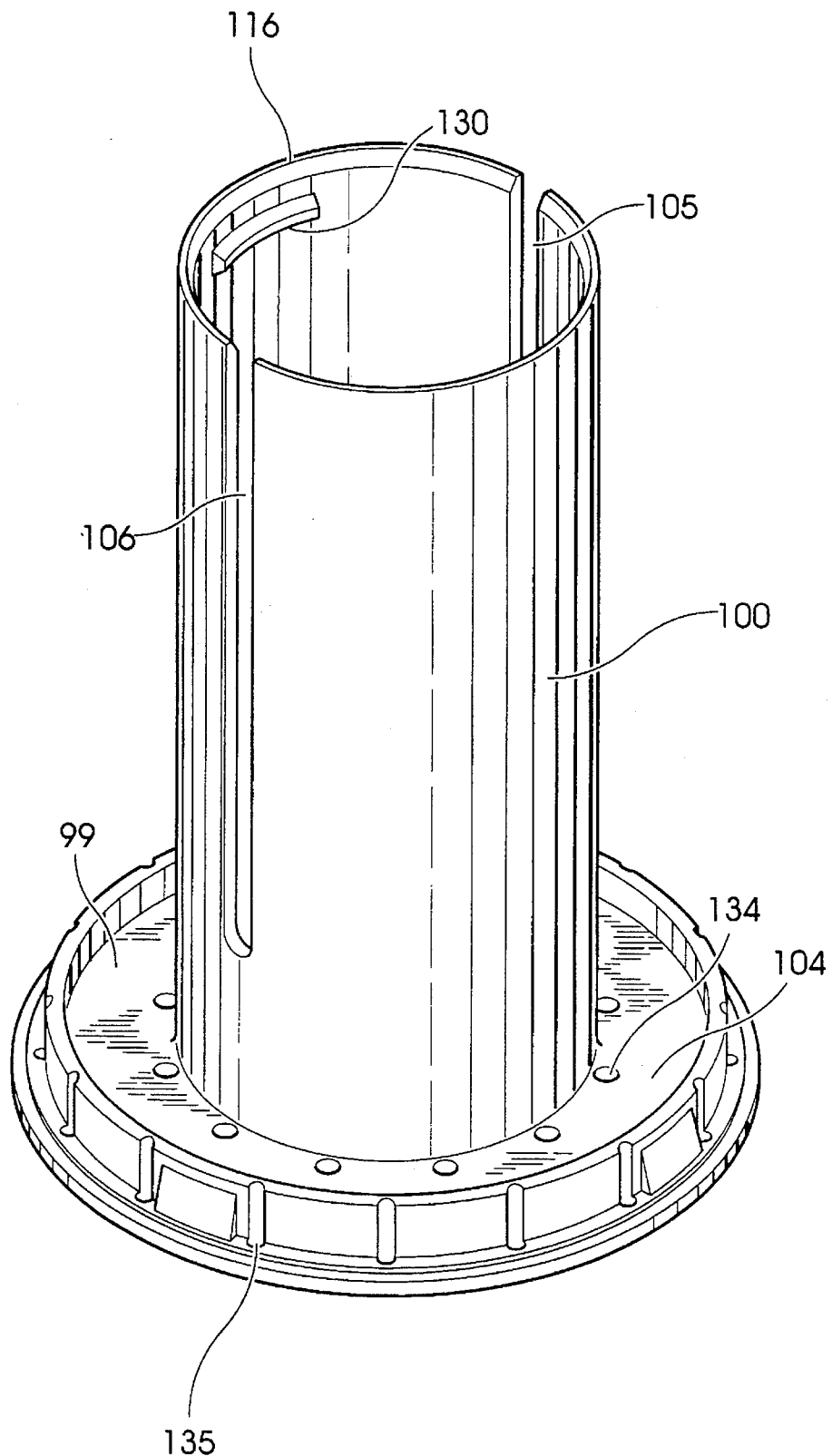
FIG. 9 is a perspective view of the FIG. 8 endplate/centertube member.

Referring to FIGS. 8 and 9 the endplate/centertube member is illustrated in greater detail. Although a majority of the main structural aspects have already been described there are a few additional features which are important to the design of the present invention and to an understanding of the present invention.

The endplate portion 99 includes two circumferential hole patterns. One hole pattern, including twelve equally-spaced seal flow holes 134, is positioned close to the centertube portion, near inside diameter edge 111. The other hole pattern, including sixteen equally-spaced holes 135, is positioned close to outer edge 136, beyond short annular wall 137. This second series of holes 135 provides the flow path from the adapter base into clearance space 120.

The first pattern of holes 134 is used to create annular ring seal 112 while the filtering element 83 is being preassembled to the endplate/centertube member 82. This preassembly step involves placing member 82 in a potting mold which defines the shape of the annular ring seal 112 which is desired to be created. With the endplate/centertube member in an inverted orientation (i.e., the endplate portion down) on the mold, a urethane adhesive or similar potting compound is placed in the shallow trough 138 defined by the centertube portion and the annular wall 137. The end of the filtering element may be sealed closed with urethane first, but regardless, when the filtering element is set down into the urethane coated shallow trough 138, the end of the filtering element is sealed closed while being secured to the endplate portion 99. The viscosity of the urethane (or other potting compound) is such that it is able to flow through holes 134 and onto the surface of the supporting mold. By specifically contouring this mold surface for a desired shape the annular ring seal 112 can be created. A suitable mold release is initially applied to the mold surface for easy separation and mold release is also used on both top and bottom surfaces of the endplate portion as well as through holes 134.

Once the sealed filtering element 83 is preassembled to the endplate/centertube member 82, a replaceable filter cartridge is created. This cartridge is then pushed into position inside the outer shell and snaps into position on the interior wall 86 as has been described. When it is time to replace the filtering element, the cartridge is pulled free from the interior wall 86 and the filtering element is then peeled off of the endplate/centertube member. The urethane comes free from member 82 due to the mold release which was initially applied. The removed filtering element and urethane can be incinerated and the plastic member 82 can then be recycled. Although the mold release enables this separation or disassembly of the filtering element from the endplate/centertube member, the mold release does not create any problems in the performance of the filter assembly due to the generally compressive nature of the final assembly.

In order to allow a snap-fit disassembly, the snap-together assembly force must be somewhat moderate. If the snap-together engagement is too tight or stiff, manual disassembly may be too difficult. The only concern with a moderate snap-together force relates to the security or tightness of the seal which is created by radial lip 118. If the abutting surfaces which clamp against radial lip 118 are not particularly tight there is a risk that the seal around radial lip 118 might leak. If some by-pass flow is permissible a seal which is not completely tight and secure would be acceptable. However, if by-pass flow is not acceptable a tight, secure seal is necessary. One way to enhance the integrity of the seal at radial lip 118 is to create a slight axial clearance in pockets 126 and 127 relative to the axial thickness of the two snaps 130 and 131. Thus when the outer shell is threaded into the adapter base the base pushes downwardly on the outer edge of the endplate portion. This in turn pushes the free end 116 of the centertube portion tighter against radial lip 118 thereby creating a greater clamping force than what was provided solely by the snap-fit assembly.

Instead of a snap-fit assembly between member 82 and the interior wall 86 of outer shell 81, a threaded engagement is contemplated within the teachings of the present invention. This type of threaded engagement is created by forming external threads on the reduced diameter portion 125 (replacing the pockets 126 and 127) and providing mating internal threads on the inside surface of the centertube portion 100 (replacing snaps 130 and 131). In this design there are fewer concerns regarding the tightness of the sealed interface provided by radial lip 118. All that would be required to increase the tightness of the seal around the radial lip 118 would be to make another one half turn or so of additional thread engagement. This would then tightly clamp the radial lip and would still provide a replaceable cartridge design.

Referring to FIGS. 10–13 there is illustrated a still further embodiment of the present invention. Filter assembly 150 includes an injection molded outer shell 151, an injection molded endplate/centertube member 152 and a filtering element 153. In a manner very similar to the FIG. 6 embodiment, filter assembly 150 is illustrated as assembled to an adapter base 154 so as to convert a conventional spin-on head to accept filter assembly 150. As was indicated for the FIG. 6 embodiment, adapter base 154 should (could) be considered as an integral mounting head on the engine.

Figure 10:
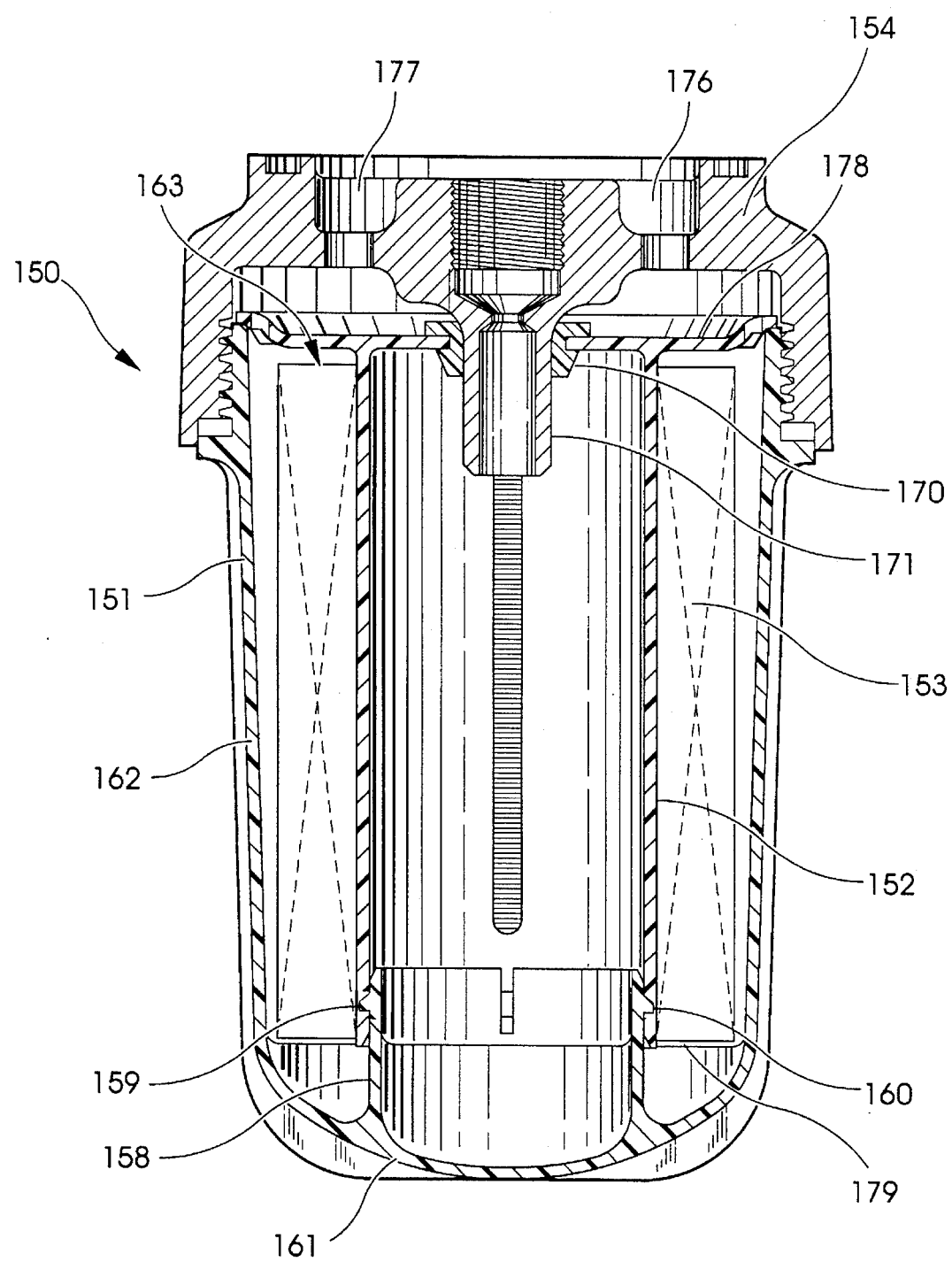
FIG. 10 is a side elevational view in full section of a filter assembly according to a typical embodiment of the present invention.

Although the embodiments of FIG. 6 (filter assembly 80) and FIG. 10 (filter assembly 150) are similar in concept and design in many ways, there are a number of structural differences. One difference relates to the manner in which the centertube portion 157 snaps onto interior wall 158. In the FIG. 10 embodiment the interior wall 158 is formed with a series of four, equally-spaced, outwardly radiating snap-in ribs 159. Centertube portion 157 includes a cooperating series of four, equally-spaced circumferential snap-over slots 160 (see FIG. 13). Each rib 159 extends around the exterior wall 158 for approximately 45 degrees. This then requires that each of the slots likewise extend for at least 45 degrees to ensure the necessary clearance for a snap-fit assembly.

Figure 11:
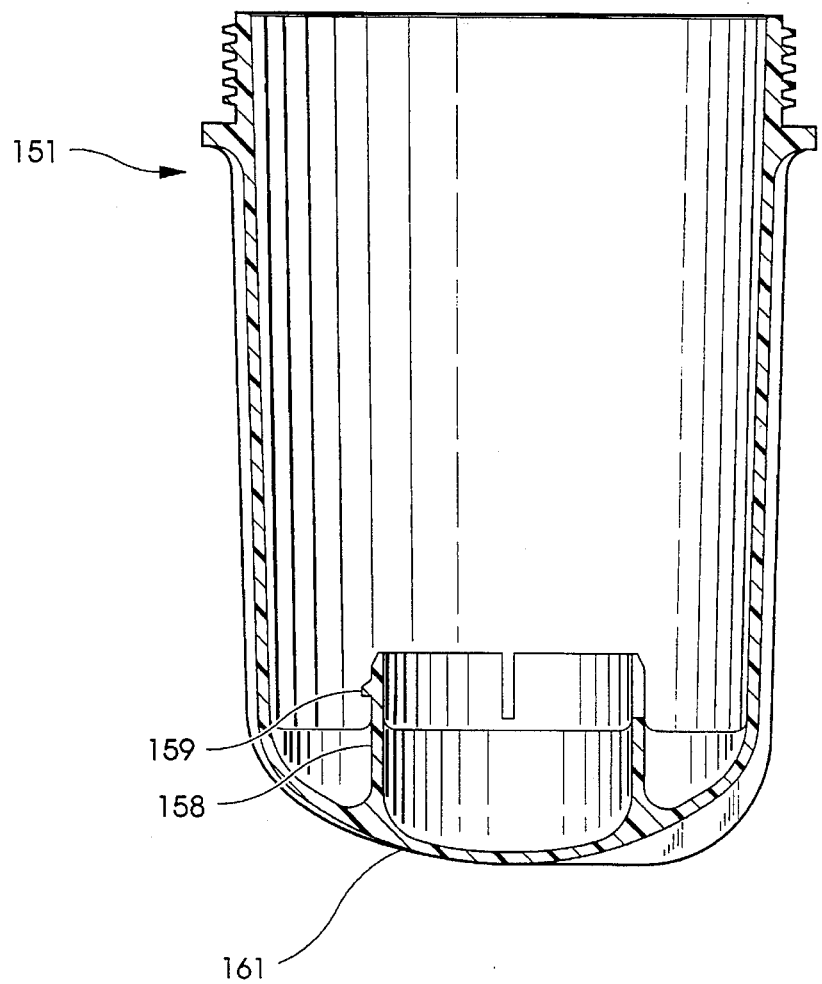
FIG. 11 is a side elevational view in full section of an outer shell comprising a portion of the FIG. 10 filter assembly as viewed along line 11—11 in FIG. 11A.
Figure 11A:
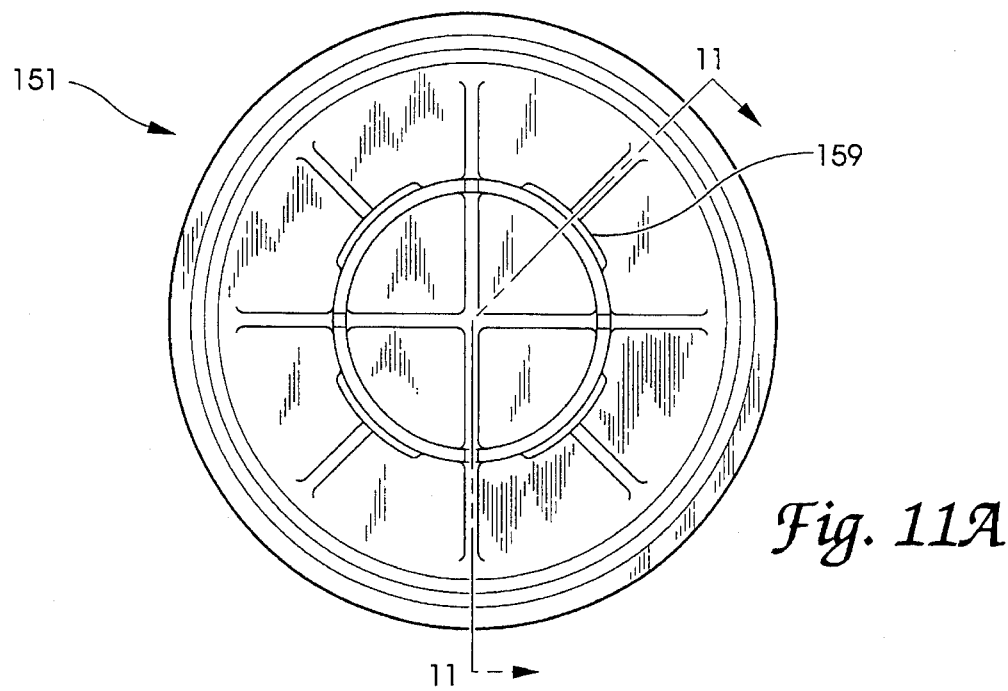
FIG. 11A is a top plan view of the open end of the FIG. 11 outer shell.

The interior wall 158 is slotted with four equally spaced slots and is integral with the closed base portion 161 of the outer shell. The generally cylindrical sidewall 162 of the outer shell 151 still has a slight draft angle on the inside surface tapering from the open end 163 toward the closed base portion 161. An end view of the FIG. 11 outer shell is provided by FIG. 11A. The cutting plane which creates FIG. 11 is noted in the FIG. 11A illustration.

Figure 12:
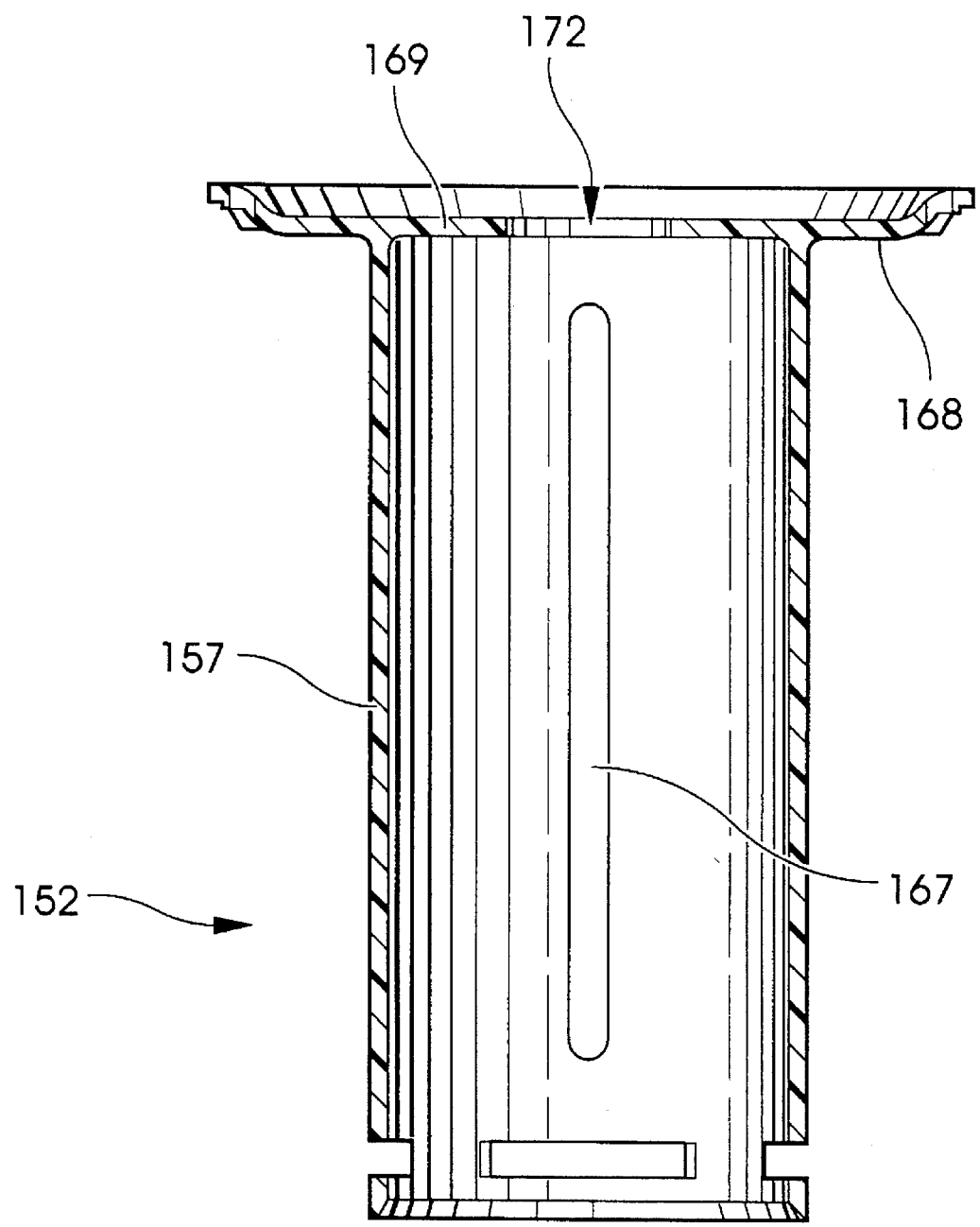
FIG. 12 is a side elevational view in full section of an endplate/centertube member comprising a portion of the FIG. 12 filter assembly.
Figure 13:
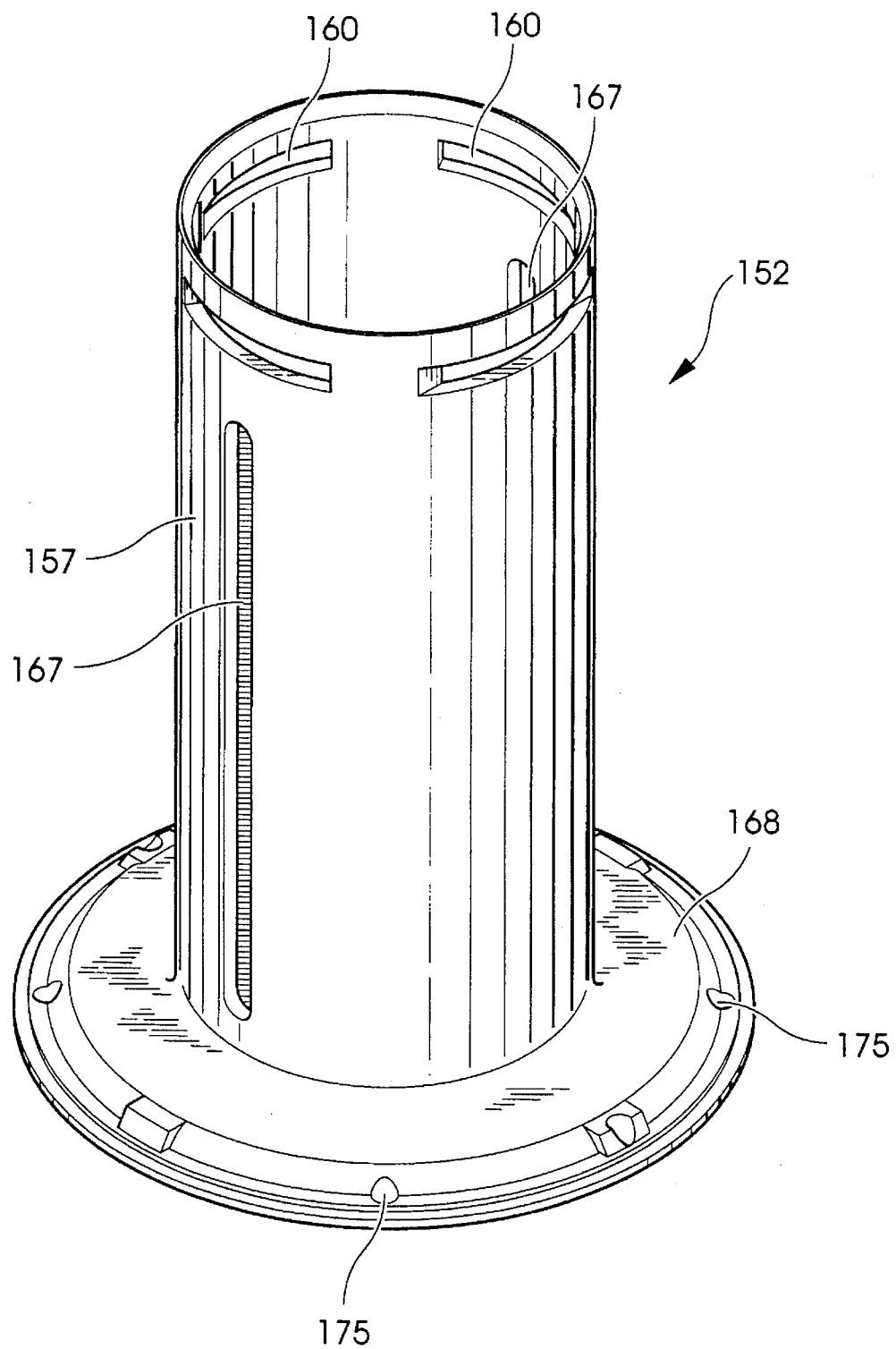
FIG. 13 is a perspective view of the FIG. 12 endplate/centertube member.

Referring specifically to FIGS. 12 and 13 the details of endplate/centertube member 152 are illustrated. The centertube portion 157 of member 152 includes two oppositely-disposed axial slots 167 which are aligned on the centers of two of the four slots 160. Endplate portion 168 includes an inner lip portion 169, a feature which is not found in endplate portion 99. This inner lip portion 169 is used in combination with annular seal 170 (see FIG. 10) to seal against and around stem 171 of adapter base 154. Seal 170 extends completely around aperture 172. In the FIG. 6 embodiment an interior seal between the filter assembly 80 and adapter base 92 was established between the inside corner (disposed at the junction of the endplate portion 99 and centertube portion 100 of member 82) and the raised outer base of the inwardly protruding stem 96.

The outer peripheral surface of endplate portion 168 includes an equally spaced series of six flow holes 175. These flow holes 175 provide incoming fluid flow communication between apertures 176 and 177 of adapter base 154 and clearance space 178.

In the embodiment of FIG. 10, like the embodiment of FIG. 6, the ends of the filtering element 153 are sealed closed. These ends may be sealed by a urethane adhesive or similar potting compound or by means of metal endplates. The hollow interior of the filtering element fits down over the centertube portion. The filtering element may be seated against the interior surface of the endplate portion by urethane adhesive or suitable potting compound as one means to preassemble the two components. If by-pass flow is acceptable a fluid-tight seal between the lower end 179 of the filtering element and the interior wall (or centertube portion) is not required.

When by-pass flow is a concern, a fluid-tight seal needs to be provided. This may be achieved by adhesively joining the lower most end of the filtering element to the free end of the centertube portion. This can be done while still preserving the snap-fit assembly method. If mold release is used with urethane it should still be possible to remove the filtering media and urethane from the endplate/centertube member 152 so that these items can be incinerated and member 152 recycled. Designing filter assembly 150 with a replaceable snap-fit filtering cartridge requires that the centertube portion and interior wall be manually separable from each other. The concern is how to establish a secure seal and still enable manual separation.

One approach is to create a flexible lip of urethane as part of the interior wall which is flexed against the filtering element when the snap-fit assembly is performed. Any fluid pressing up on the flexed lip only tightens the sealing and provides a suitable means to relax the tightness of the snap-fit assembly.

When the filtering element is not intended to be part of the replaceable cartridge, numerous designs are possible to seat and seal the filtering element in the outer shell. One of the easiest approach being to inject a volume of potting compound into the outer shell against the closed base portion and then shove the filtering element into that potting compound. The opposite end of the filtering element is then sealed against the endplate portion.

Figure 14:
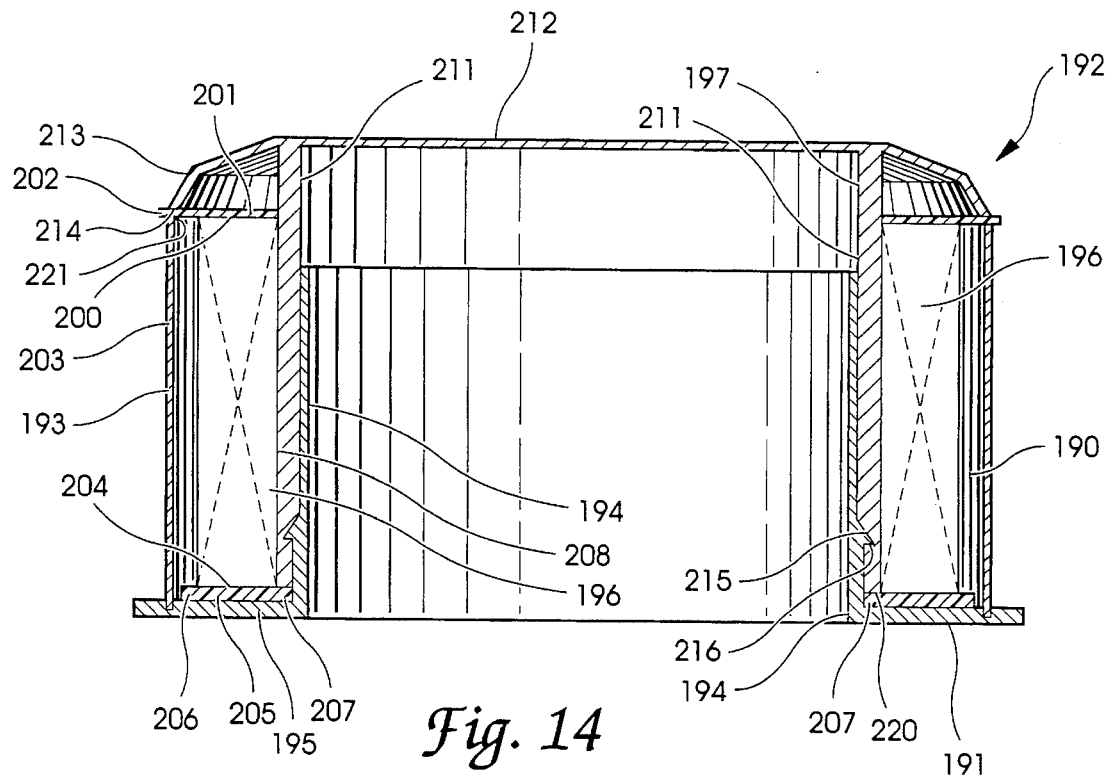
FIG. 14 is a diagrammatic side elevational view in full section of a snap-in, replaceable air filter cartridge according to the present invention.

Referring now to FIG. 14 a replaceable air filter cartridge 190 is illustrated as snapped-in to an air filter housing 191. The assembly 192 is illustrated as a side elevational view though it will be understood that the cartridge 190, filter housing 191 and other components are typically annular or generally cylindrical in shape.

The air filter housing 191 includes an outer, generally cylindrical perforated wall 193, an inner, generally cylindrical perforated wall 194 and an annular base 195. These three portions are permanent parts of the air filter housing. The snap-in, replaceable air filter cartridge 190 can be thought of as having two primary component parts. One primary part is the filter element 196 and the other primary part is the reuseable, metal endplate/centertube 197. While these two parts can be preassembled to each other before being loaded into the air filter housing 191, element 196 and endplate/centertube 197 are not attached to each other.

The upper end 200 of filter element 196 is sealed by a layer 201 of urethane. Layer 201 has a outwardly extending lip 202 which radially extends beyond the outer wall 203 of filter element 196. The lower end 204 of filter element 196 is also sealed by a layer 205 of urethane. Layer 205 has an outwardly extending lip 206 which radially extends beyond outer wall 203 and an inwardly extending lip 207 which extends radially inwardly beyond the inner wall 208 of filter element 196.

Endplate/centertube 197 includes a generally cylindrical inner wall 211 which symmetrically intersects top panel 212. The outwardly radiating flange 213 of top panel 212 provides a lower, annular clamping edge 214. The lower area of inner wall 211 is arranged with an inwardly directed, annular sawtooth channel 215. In a cooperating manner the lower area of inner wall 194 is arranged with an outwardly protruding, annular sawtooth lip 216. The assembly 192 of the air filter cartridge 190 and air filter housing 191 begins by sliding the filter element 196 over inner wall 211 or inserting the endplate/centertube into the filter element until lip 202 abuts up against edge 214. This positioning also places the lower edge 220 of inner wall 211 up against lip 207. Assembly 192 is then inserted down into the hollow annular interior of air filter housing 191 between inner wall 194 and outer wall 193. When layer 205 abuts up against annular base 195, lip 202 abuts up against the upper end 221 of outer wall 193. However, in this position sawtooth 216 is not fully seated within sawtooth channel 215. By the application of additional clamping force on top panel 212 lip 216 and channel 215 become fully engaged thereby creating a snap-fit assembly. The additional downward movement of endplate/centertube 197 in order for lip 216 and channel 215 to become fully engaged creates a tight clamping force on lip 202 and on lip 207 thereby creating a tightly sealed assembly.

Figure 15:
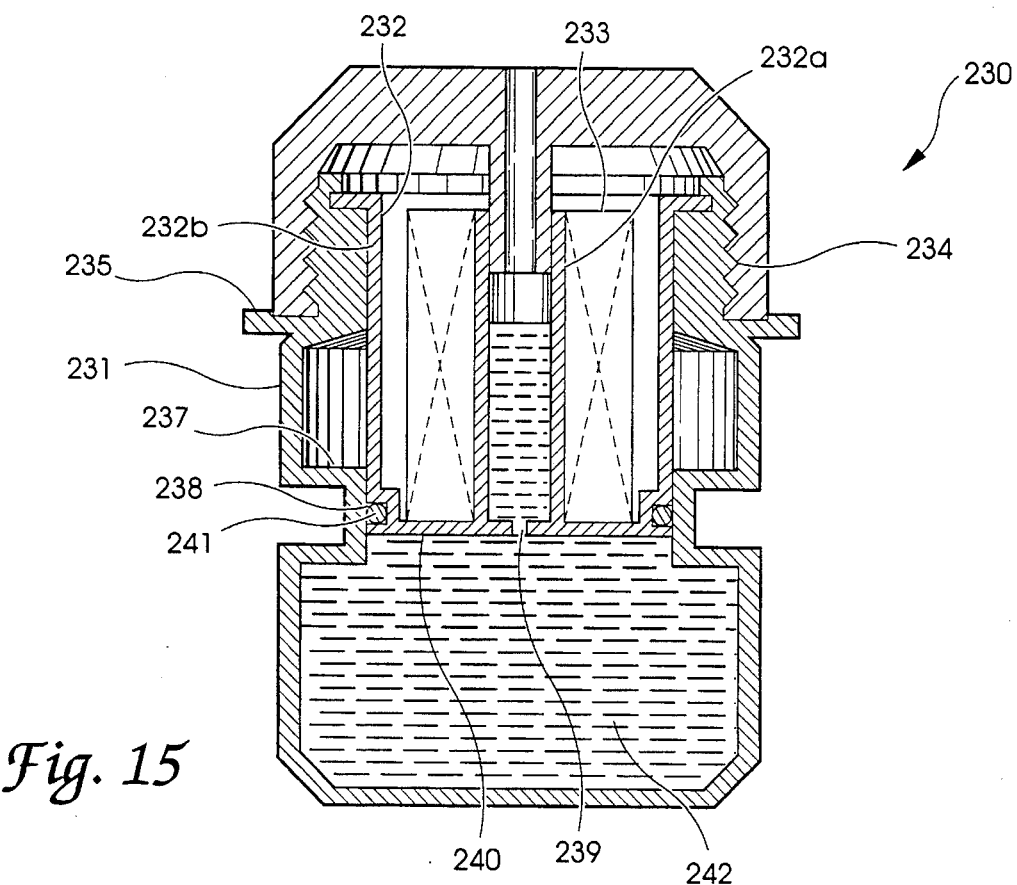
FIG. 15 is a diagrammatic side elevational view in full section of a coolant filter having a reservoir of supplemental coolant additive according to the present invention.

Referring to FIG. 15 an extended service interval coolant filter 230 according to the present invention is illustrated. Since filter 230 can be constructed in a manner which is quite similar in part to a number of features of earlier embodiments, the primary focus herein will be on the additions and differences. The primary component parts of filter 230 include outer shell 231, centertube 232 and filter element 233. Outer shell 231 is similar in several respects to earlier outer shell constructions as described herein, including an externally threaded open end 234 and an annular, outwardly radiating flange 235. Centertube 232 includes an inner wall 232a which is disposed through the center of the filtering element and an outer wall 232b which snaps into outer shell 231 adjacent the open end 234 in a manner which is virtually identical to the snap-fit technique illustrated in FIG. 5.

One difference between the outer shell design of FIG. 15 and the other shell designs described herein is the formation of an inwardly protruding radial rib 237. Another difference is found in the design of the endplate/centertube 232 which now includes an annular O-ring groove 238. Also included in the modified design of the endplate/centertube 232 is a small orifice 239 which is centrally located in base 240. Disposed in the center of the endplate/centertube 232 is an initial charge of a supplemental coolant additive which may be anyone of several chemical compositions which are known for use as a coolant additive. While the initial manufacture and assembly would not include the initial charge, a liquid volume has been shown in FIG. 15 to help with the understanding of the invention.

The location of O-ring groove 238 coincides in the axial direction with the approximate center of rib 237. From the standpoint of diameter sizes there is virtually a line-to-line fit between the outside of the endplate/centertube and the inside of rib 237. Consequently, a properly sized and seated O-ring 241 in groove 238 establishes a tight and secure liquid seal against rib 237 so as to completely close off chamber 242 with the exception of orifice 239. Chamber 242 which is defined by outer shell 231 and the base or end of endplate/centertube 232 is filled with a make-up (reservoir) supply of supplemental coolant additive. Here again, a separate liquid volume has been illustrated to aid in an understanding of the invention. As the initial charge of supplemental coolant additive which is disposed in the center of the endplate/centertube is used, a make-up amount gradually diffuses in through orifice 239 from the reservoir supply in chamber 242. This design provides a greater life cycle for the filter and thus the reference to this design as an "extended service interval" coolant filter.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A snap-together filter assembly for filtering fluids comprising:

a unitary injection molded plastic outer shell having an open end and means defining a hollow interior and including a closed base opposite to said open end, said outer shell further including an annular wall extending into the hollow interior from said closed base toward said open end;

a filtering element having means defining a hollow center portion and being disposed within the hollow interior of said outer shell; and a unitary endplate and centertube member having an endplate portion and a centertube, wherein said centertube and said annular wall each include connecting means thereon for defining a snap-together interfit between said centertube and said annular wall to secure the endplate and centertube member to the outer shell, said centertube extending through the hollow center portion of said filtering element.

2. The filter assembly of claim 1 wherein said filtering element having a first end and a second end which is disposed axially opposite to said first end, said first and second ends being sealed closed so as to restrict fluid flow radially through said filtering element.

3. The filter assembly of claim 2 wherein said centertube having means defining a plurality of fluid flow slots.

4. The filter assembly of claim 1 wherein said endplate portion having means defining an integral annular wall which is disposed outwardly of said centertube and which is generally concentric with said centertube.

5. The filter assembly of claim 4 wherein said endplate portion having means defining a plurality of seal flow holes.

6. A snap-together filter assembly for filtering fluids comprising:

a unitary injection molded plastic outer shell having an open end and means defining a hollow interior and including a closed base opposite to said open end, said outer shell further including an annular wall extending into the hollow interior from said closed base toward said open end;

a filtering element having means defining a hollow center portion and being disposed within the hollow interior of said outer shell; and a unitary endplate and centertube member having an endplate portion and a centertube, wherein said centertube and said annular wall each include connecting means thereon for defining a snap-together interfit between said centertube and said annular wall to secure the endplate and centertube member to the outer shell, said centertube extending through the hollow center portion of said filtering element, said annular wall having means defining a plurality of receiving slots for said snap-together interfit.

7. The filter assembly of claim 6 wherein said centertube having means defining a plurality of snap-fit projections which are sized and spaced to be received by said receiving slots.

8. A snap-together filter assembly for filtering fluids comprising:

a unitary injection molded plastic outer shell having an open end and means defining a hollow interior and including a closed base opposite to said open end, said outer shell further including an annular wall extending into the hollow interior from said closed base toward said open end;

a filtering element having means defining a hollow center portion and being disposed within the hollow interior of said outer shell; and a unitary endplate and centertube member having an endplate portion and a centertube, wherein said centertube and said annular wall each include connecting means thereon for defining a snap-together interfit between said centertube and said annular wall to secure the endplate and centertube member to the outer shell, said centertube extending through the hollow center portion of said filtering element, said endplate portion having means defining a plurality of inlet flow apertures and an exit flow aperture.

9. The filter assembly of claim 8 wherein said endplate portion having means defining an integral annular wall which is disposed outwardly of said centertube and which is generally concentric with said centertube.

10. A snap-together filter assembly for filtering fluids comprising:

an injection molded plastic outer shell having an open end and means defining a hollow interior and including a closed base opposite to said open end, an integral annular wall extending into the hollow interior from said closed base toward said open end;

a filtering element having means defining a hollow center portion and being disposed within the hollow interior of said outer shell;

an integral endplate and centertube member having an endplate portion and a centertube, wherein said centertube and said annular wall each include connecting means thereon for defining a snap-together interface between said centertube and said integral annular wall to secure the endplate and centertube member to the outer shell, said centertube extending through the hollow center portion of said filtering element, said endplate portion having means defining a plurality of inlet flow apertures and an exit flow aperture, said endplate portion further having means defining an integral annular wall which is disposed outwardly of said centertube and which is generally concentric with said centertube; and wherein said plurality of inlet flow apertures is disposed radially outward of said integral annular wall defined by said endplate portion and wherein said exit flow aperture is generally centered within said centertube.

11. The filter assembly of claim 10 wherein said endplate portion having means defining a plurality of seal flow holes.

12. The filter assembly of claim 11 wherein the integral combination of the endplate portion, centertube and the integral annular wall of said endplate portion define an annular ring trough and wherein the filtering element is received by said annular ring trough and is joined thereto by a cured potting compound.

13. The filter assembly of claim 12 wherein said cured potting compound extends through said seal flow holes and is shaped to provide an annular exit flow seal disposed around said centertube.

14. A snap-together filter assembly for filtering fluids comprising:

a unitary injection molded plastic outer shell having an open end and means defining a hollow interior and including a closed base opposite to said open end, said outer shell further including an annular wall extending into the hollow interior from said closed base toward said open end;

a filtering element having means defining a hollow center portion and being disposed within the hollow interior of said outer shell; and a unitary endplate and centertube member having an endplate portion and a centertube, wherein said centertube and said annular wall each include connecting means thereon for defining a snap-together interfit between said centertube and said annular wall to secure the endplate and centertube member to the outer shell, said centertube extending through the hollow center portion of said filtering element, said endplate portion having means defining an integral annular wall which is disposed outwardly of said centertube and which is generally concentric with said centertube, said endplate portion further having means defining a plurality of seal flow holes; and wherein the integral combination of the endplate portion, centertube and the integral annular wall of said endplate portion define an annular ring trough and wherein the filtering element is received by said annular ring trough and is joined thereto by a cured potting compound.

15. The filter assembly of claim 14 wherein said cured potting compound extends through said seal flow holes and is shaped to provide an annular exit flow seal disposed around said centertube.

16. A snap-together filter assembly for filtering fluids comprising:

an injection molded plastic outer shell having an open end and means defining a hollow interior and including a closed base opposite to said open end, an integral annular wall extending into the hollow interior from said closed base toward said open end;

a filtering element having means defining a hollow center portion and being disposed within the hollow interior of said outer shell;

an integral endplate and centertube member having an endplate portion and a centertube, wherein said centertube and said annular wall each include connecting means thereon for defining a snap-together interface between said centertube and said integral annular wall to secure the endplate and centertube member to the outer shell, said centertube extending through the hollow center portion of said filtering element; and wherein the interface between said centertube and said integral annular wall includes an abutment surface defined by said integral annular wall and a free end of said centertube and disposed therebetween an annular sealing gasket.

17. A filter assembly for filtering fluids comprising:

a unitary injection molded plastic outer shell having an open end and means defining a hollow interior and including a closed base opposite to said open end, said outer shell further including a generally cylindrical wall extending into the hollow interior from said closed base toward said open end;

a filtering element having means defining a hollow center portion and being disposed within the hollow interior of said outer shell; and a unitary endplate and centertube member positioned within said outer shell and having an endplate portion and a centertube, said centertube extending through the hollow center portion of said filtering element, said generally cylindrical wall being constructed and arranged with a plurality of snap-fit apertures and said centertube being constructed and arranged with a plurality of snap-fit projections for assembling said endplate and centertube member to said outer shell by the snap fit of said projections into said apertures for securing the endplate and centertube member to the outer shell.

18. The filter assembly of claim 17 wherein said endplate portion having means defining an integral annular wall which is disposed outwardly of said centertube and which is generally concentric with said centertube.

19. The filter assembly of claim 18 wherein said endplate portion having means defining a plurality of seal flow holes.

20. A filter assembly of claim 19 wherein the integral combination of the endplate portion, centertube and the integral annular wall of said endplate portion defined an annular ring trough and wherein the filtering element is received by said annular ring trough and is joined thereto by a cured potting compound.

21. A filter assembly of claim 20 wherein said cured potting compound extends through said seal flow holes and is shaped to provide an annular exit flow seal disposed around said centertube.

22. A filter assembly for filtering fluids comprising:

a plastic outer shell having an open end and means defining a hollow interior and including a closed base opposite to said open end and an annular wall integral with said base and an extending from said base part way toward said open end;

a filtering element having a means defining a hollow center portion and being disposed within the hollow interior of said outer shell;

a sealing layer disposed over a first end of said filtering element, said sealing layer being formed with an inwardly extending radial lip; and an integral endplate and centertube member having an endplate portion and a centertube, wherein said centertube and said annular wall each include connecting means thereon for defining a snap-together interface to secure the endplate and centertube member to the outer shell, said annular wall providing an abutment surface and the free end of said centertube providing a second abutment surface, said inwardly extending radial lip being disposed between said two abutment surfaces, said centertube extending through the hollow center portion of said filtering element.

23. A snap-together filter assembly for filtering fluids comprising:
- a unitary injection molded plastic outer shell having an open end and means defining a hollow interior and including a closed base opposite to said open end, an integral annular wall extending into the hollow interior from said closed base toward said open end;
- a filtering element having means defining a hollow center portion and being disposed within the hollow interior of said outer shell; and
- a unitary endplate and centertube member having an endplate portion and a centertube, wherein said centertube and said annular wall each include connecting means thereon for defining a snap-together interface between said centertube and said integral annular wall to secure the endplate and centertube member to the outer shell, said centertube extending through the hollow center portion of said filtering element.

24. A filter assembly for filtering fluids comprising:
- an injection molded plastic outer shell having an open end and means defining a hollow interior and including a closed base opposite to said open end said outer shell further including a generally cylindrical wall extending into the hollow interior from said closed base toward said open end;
- a filtering element having means defining a hollow center portion and being disposed within the hollow interior of said outer shell; and
- a unitary endplate and centertube member positioned within said outer shell and having an endplate portion and a centertube, said centertube extending through the hollow center portion of said filtering element, said generally cylindrical wall being constructed and arranged with a plurality of snap-fit apertures and said centertube being constructed and arranged with a plurality of snap-fit projections for assembling said endplate and centertube member to said outer shell by the snap-fit assembly of said projections into said apertures.

* * * * *